United States Patent [19] [11] 3,911,514
Ito [45] Oct. 14, 1975

[54] RAFT MATERIALS FOR AQUATIC CULTIVATION

[75] Inventor: Hideo Ito, Sapporo, Japan

[73] Assignees: Sumitomo Bakelite Company Limited, Tokyo, Japan; Hokkai Taiyo Plastic Co., Ltd., Sapporo, both of Japan

[22] Filed: June 1, 1972

[21] Appl. No.: 258,573

[30] Foreign Application Priority Data
June 5, 1971 Japan.............................. 46-39033

[52] U.S. Cl........................................ 9/8 R; 47/1.2
[51] Int. Cl.².................................... B63B 21/52
[58] Field of Search................. 9/8 R, 11 A, 11 R; 425/327; 156/515; 114/219, .5 D; 264/150; 47/1.2; 43/43.1

[56] References Cited
UNITED STATES PATENTS

| | | | |
|---|---|---|---|
| 2,327,794 | 8/1943 | Hurt............................... | 9/11 A X |
| 2,437,884 | 3/1948 | Maynard........................... | 264/150 |
| 2,816,837 | 12/1957 | Holsman........................ | 425/327 X |
| 2,875,721 | 3/1959 | Downey.......................... | 114/219 |
| 3,145,686 | 8/1964 | Blythe............................ | 114/219 |
| 3,217,071 | 11/1965 | Plymale et al. ................. | 156/515 X |
| 3,234,069 | 2/1966 | Szasz................................ | 156/515 X |
| 3,305,259 | 2/1967 | Johnson et al..................... | 114/219 |
| 3,456,385 | 7/1969 | Plath............................... | 9/345 X |
| 3,663,672 | 5/1972 | Button et al. ..................... | 264/96 |

Primary Examiner—Trygve M. Blix
Assistant Examiner—Gregory W. O'Connor
Attorney, Agent, or Firm—Karl W. Flocks

[57] ABSTRACT

A raft material for cultivation consisting essentially of a hollow tubular body made of a synthetic resin, such as polyvinyl chloride, polypropylene, ABS, polybutylene or nylon, whose both ends are sealed into flat portions extended in the longitudinal direction and which has such a shape that the diameter of the tubular body is smaller than the width of each flat portion but is larger than the thickness of each flat portion. Said raft material can be produced by extruding a synthetic resin from an extruder into a tube, sealing or press-molding the tube at desired portions by means of press plates or mold plates while the inner surface of the tube is still in the molten state or in a state that the inner surfaces of the tube are easily melt-adhered to each other when the tube is externally pressed by means of the plates, and then cutting the tube at the sealed or press-molded portions.

7 Claims, 7 Drawing Figures

RAFT MATERIALS FOR AQUATIC CULTIVATION

This invention relates to tubular bodies which have individually been sealed at both ends and to a process for producing the same.

The tubular bodies of the present invention which have individually been sealed at both ends are used as raft materials for cultivation, and the process for producing the tubular bodies of the present invention comprises extruding a synthetic resin from an extruder into a tube, pressing the tube at the desired portions by means of press plates or mold plates prior to the completion of the extrusion molding, to seal or press-mold the tube at said portions, and then cutting the tube at the sealed or press-molded portions to obtain tubular bodies which have individually been sealed at both ends.

Heretofore, rafts for the cultivation of marine products, particularly seaweeds, or floats and buoys to be attached to fishing-nets, have been made of wood or bamboo. However, wood and bamboo are low in durability and have had such drawbacks that when wetted with water or sea-water, they are deteriorated in strength, and when dipped in water or sea-water over a long period of time, they absorb water and thus become low in buoyancy. Recently, rafts for cultivation have come to be produced by use of tubular bodies made of synthetic resins. The synthetic resin tubular bodies as raft materials have such advantages that they are excellent in durability and high in strength, but have such a trouble that they have to be individually sealed at both ends. Conventional procedures for sealing have been effected in such a manner that tubular bodies having a desired length are cut from a long tube having open ends which has completely subjected to extrusion molding, and lid materials molded independently of said tube are adhered to the tubular bodies by use of an adhesive, or are melt-adhered thereto by application of heat or are fixed in the tubular bodies. According to the above-mentioned procedures, however, there have been brought about such economical and operational drawbacks that the lid materials are required to be prepared separately, the operations are low in efficiency and troublesome, and the raft materials cannot be produced in large quantities in a short period of time.

An object of the present invention is to provide a raft material excellent in durability and high in strength.

Another object of the invention is to provide a process for the economical and continuous production of a raft material.

In the accompanying drawings.

Figure 1:
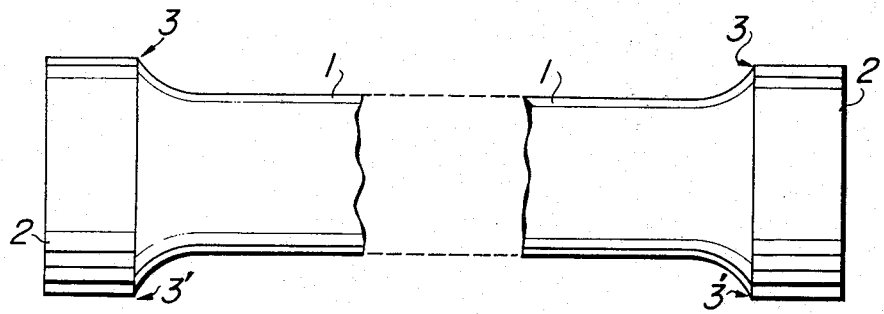
FIG. 1 is a plan view of a raft material within the invention.
Figure 2:
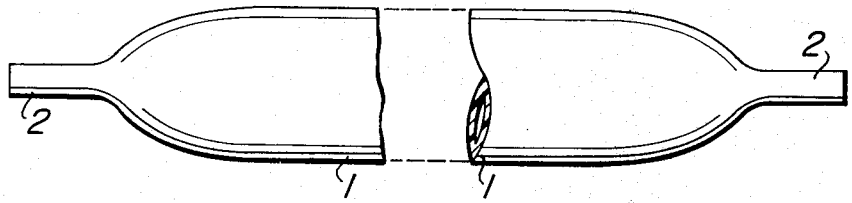
FIG. 2 is a lateral view of the raft material shown in FIG. 1.
Figure 3:
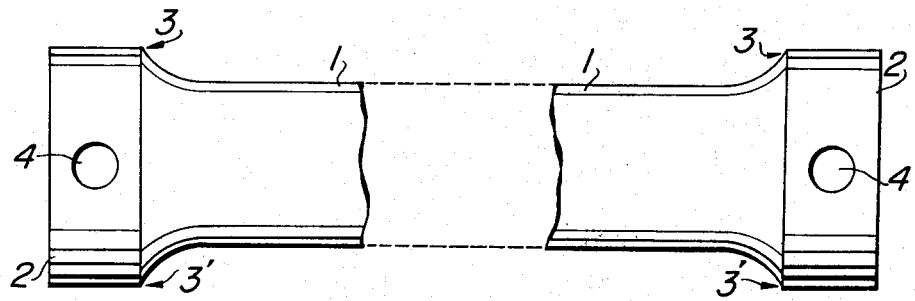
FIG. 3 is a plan view of a raft material within the invention which has holes in the flat portions.
Figure 4:
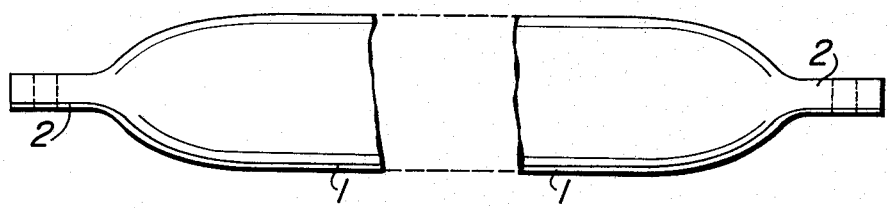
FIG. 4 is a lateral view of the raft material shown in FIG. 3.

As is clear from FIGS. 1 and 4, the raft material of the invention is a synthetic resin raft material composed of a hollow tubular body 1 which has been sealed at both ends by means of flat portions 2 extended in the longitudinal direction, and which has such a shape that the diameter of the tubular body is smaller than the width 3–3' of each flat portion 2, but is larger than the thickness of each flat portion. The joint part of the tubular body to the flat portion has preferably such a shape as shown in FIGS. 1 and 2. The raft material of the invention may have holes 4 in the flat portions 2, as seen in FIGS. 3 and 4.

When fixed by means of a rope, the raft material according to the present invention does not slip out since the ends thereof have been at the flat portions. In the case of the raft material having holes in the flat portions, the raft material can be firmly fixed by passing a rope through the holes.

The flat portions and the holes may have any of semi-circular, oval and the like shapes.

The raft material of the invention may be produced according to a process carried out by cutting a synthetic resin tube to a desired length, pressing the both ends of the cut tube, and melt-adhering the ends by application of heat. Alternatively, the raft material can be produced according to such a continuous process as mentioned below.

A synthetic resin, which has been extruded from an extruder, is passed through a die and a sizing box (or a substitute therefor) and, immediately before completion of the extrusion molding of the resulting tube (i.e. while the inner surface of the tube is still in the molten state or in a state that the inner surfaces of the tube are easily melt-adhered to each other when the tube is externally pressed), the tube is pressed at desired portions by means of two press plates or mold plates either from the upper and lower sides, from the right and left sides or from any other directions, thereby sealing or press-molding the tube at said portions. This operation is continuously effected at desired intervals, whereby raft materials can be produced in large quantities simply and efficiently.

The above-mentioned continuous process is explained below with reference to FIGS. 5 to 7 of the accompanying drawings.

Figure 5:
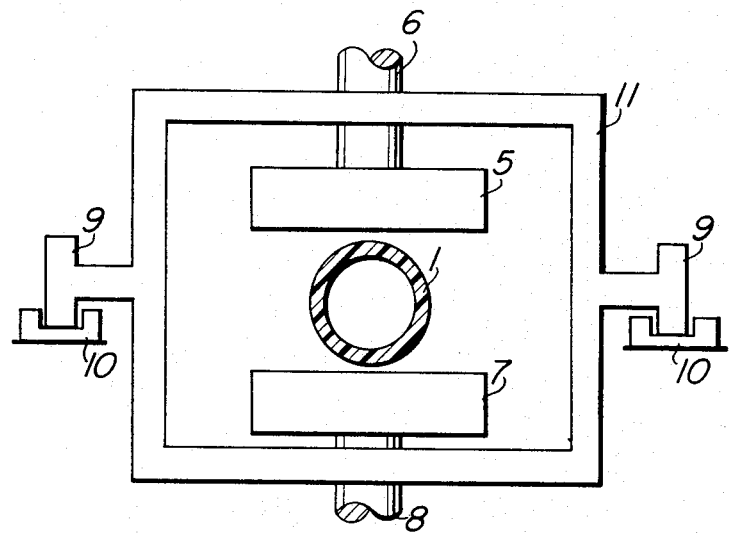
FIGS. 5 to 7 show means for accomplishing the process of the present invention in a front view and two lateral views during the process respectively.
Figure 6:
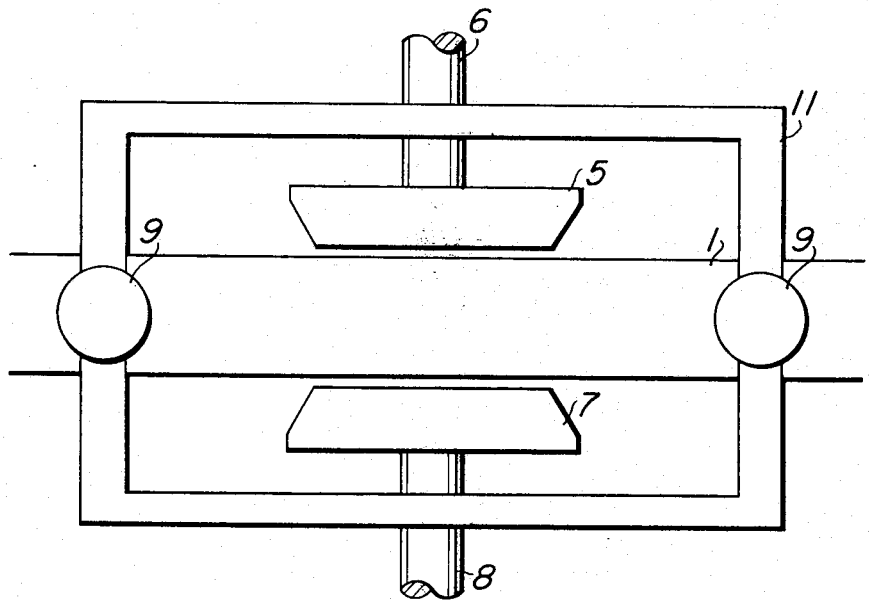

FIG. 5 shows a synthetic resin tube and a means for press-molding the tube, and is a front view of said means when viewed from the direction of flow of the tube; and FIG. 6 is a lateral view of the means shown in FIG. 5 when viewed from the side. In FIGS. 5 and 6, 1 is the synthetic resin tube; 5 and 7 are press plates or mold plates, 6 and 8 are rods for operating the molds; 9 shows pulleys for moving a frame to which the press plates or mold plates have been attached; 10 shows rails for the pulleys; and 11 shows the above-mentioned frame. (In FIG. 6, the rails 10 are not shown.)

Assuming that in FIG. 6 the synthetic resin tube is sent from the right, the operation is carried out as mentioned below.

When a predetermined signal is given, the upper press plate or mold plate 5, which has been at a predetermined position, is moved downwardly by means of the rod 6 and, at the same time, the lower press plate or mold plate 7 is moved upwardly by means of the rod 8, with the result that the tube 1 is sealed or press-molded into a shape corresponding to the shapes of the press plates or mold plates 5 and 7. (In this case, either one of the press plates or mold plates 5 and 7 may have been fixed and only the other press plate or mold plate may be moved.)

When applying to the tube 1 the press plates or mold plates by means of the rods 6 and 8, the press plates or mold plates 5 and 7 are continuously moved as they are together with the tube (i.e. while pressing the tube) in the direction of flow of the tube (to the left) at the same speed as that of the tube. The movement of the press plates or mold plates is smoothly effected by means of the pulleys 9 and the rails 10 (not shown in FIG. 6). The press plates or mold plates are moved until the extruded tube comes to show no change in shape even after the press plates or mold plates have been released therefrom.

Figure 7:
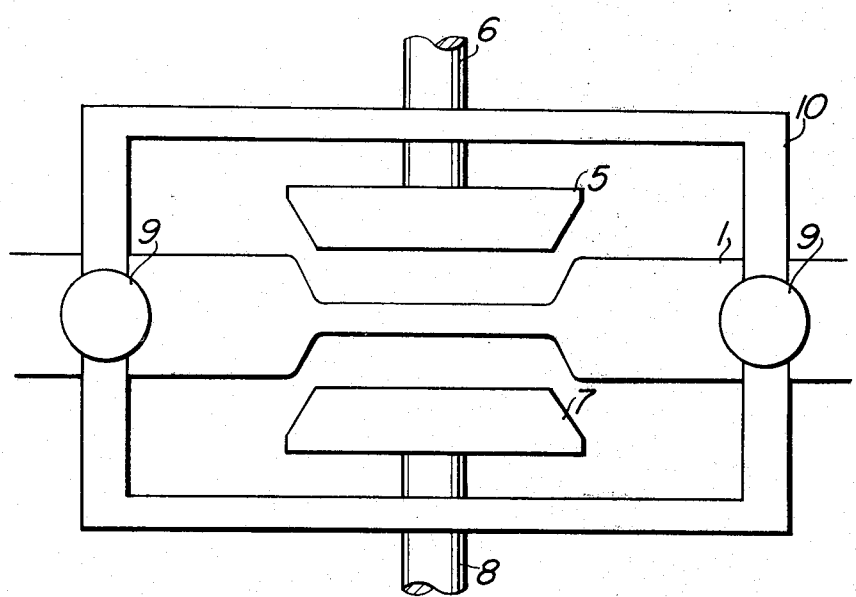

FIG. 7 shows the state of the molding means immediately after releasing the press plates or mold plates from the tube, in which state no change in shape is caused (i.e. the state of the tube in which the molding has been completed). The numerals in FIG. 7 are same as in FIGS. 5 and 6.

Even when the press plates or mold plates have been released, the molded tube flows as it is to the left, and the frame 11 is returned to the initial position (in proportion to the moved distance) and is ready for the subsequent press-molding. When the above operation is repeated, the sealing or press-molding can be effected continuously, and when the tube is cut at the sealed or press-molded portions (ordinarily at the centers of said portions), tubular bodies which have individually been sealed at both ends can be obtained.

The above-mentioned press plates or mold plates may be any of wood press plates or mold plates and metal press plates or mold plates, and any desired shape can be applied to the tube by using press plates or mold plates of various shapes.

The synthetic resin used in the present invention includes polyvinyl chloride, polypropylene, ABS (acrylonitrile-butadiene-styrene resin), polybutylene, nylon, and the like.

I claim:

1. A raft material for aquatic cultivation consisting essentially of a hollow tubular body made of a synthetic resin whose both ends are sealed into transverse flat portions, with each of said flat portions having a hole therethrough and with each of said flat sealed portions extending beyond the hole both longitudinally inward toward said hollow tubular body and transversely toward the side edges, and which has such a shape that the diameter of the tubular body is smaller than the transverse dimension of each flat portion, but is larger in thickness than the thickness of each flat portion.

2. A raft material according to claim 1, wherein the synthetic resin is polyethylene.

3. A raft material according to claim 1, wherein the synthetic resin is polyvinyl chloride.

4. A raft material according to claim 1, wherein the synthetic resin is polypropylene.

5. A raft material according to claim 1, wherein the synthetic resin is ABS resin.

6. A raft material according to claim 1, wherein the synthetic resin is polybutylene.

7. A raft material according to claim 1, wherein the synthetic resin is nylon.

* * * * *